US005595767A

United States Patent [19]

Cinquin et al.

[11] Patent Number: 5,595,767

[45] Date of Patent: Jan. 21, 1997

[54] THREE-DIMENSIONAL ENERGY DISTRIBUTION DEVICE

[75] Inventors: Philippe Cinquin; Laurent Desbat, both of Grenoble, France

[73] Assignee: Universite Joseph Fourier, Grenoble Cedex, France

[21] Appl. No.: 313,062

[22] PCT Filed: Mar. 23, 1993

[86] PCT No.: PCT/FR93/00286

§ 371 Date: Nov. 23, 1994

§ 102(e) Date: Nov. 23, 1994

[87] PCT Pub. No.: WO93/20528

PCT Pub. Date: Oct. 14, 1993

[30] Foreign Application Priority Data

Mar. 27, 1992 [FR] France .................................. 92 04132

[51] Int. Cl.[6] .................................................. B29C 35/08

[52] U.S. Cl. .............................................. 425/174.4; 345/6

[58] Field of Search ................................ 425/174.4, 174; 427/595–597; 264/401, 219, 308; 118/620, 621; 345/6, 4, 5; 346/153.1, 155, 159; 430/45; 156/62.2, 272.8, 630; 347/123, 125, 154; 359/53, 73, 76

[56] References Cited

U.S. PATENT DOCUMENTS

| | | | |
|---|---|---|---|
| 3,493,290 | 2/1970 | Traub | 345/6 X |
| 3,609,706 | 9/1971 | Adamson | 345/6 X |
| 3,848,247 | 11/1974 | Sherr | 345/6 |
| 4,670,744 | 6/1987 | Buzak | 359/73 X |
| 4,881,068 | 11/1989 | Korevaar et al. | 345/6 |
| 5,143,817 | 9/1992 | Lawton et al. | 264/401 |
| 5,214,420 | 5/1993 | Thompson et al. | 345/6 |

FOREIGN PATENT DOCUMENTS 0322257 6/1989 European Pat. Off. .

OTHER PUBLICATIONS

"Three–Dimentional Displays Based Upon the Sequential Excitation of Fluorescence", by Verber et al, 72IEEE, Intercon, Mar. 20, 1972, pp. 118–119.

"Computer Generated 3D Displays", by Pole, IBM Technical Disclosure Bulletin, vol. 10, No. 5, Oct. 5, 1967.

*Primary Examiner*—Richard L. Chiesa
*Attorney, Agent, or Firm*—Lowe, Price, LeBlanc & Becker

[57] ABSTRACT

A three-dimensional energy distribution device includes a volume reacting to the energy of a predetermined radiation; a plurality of sources of the radiation illuminating the volume according to respective angles; and, placed between each source and the volume, a support that is transparent to the radiation and that includes an image corresponding to a density projection of a real or virtual object examined at the angle the respective source illuminates the volume, the projection having been subjected to an image correction process.

11 Claims, 2 Drawing Sheets

THREE-DIMENSIONAL ENERGY DISTRIBUTION DEVICE

The invention relates to three-dimensional energy distributors allowing, for example, to constitute a 3-D image from light energy.

BACKGROUND OF INVENTION

It is often desired, for example in the medical field, to display objects that are not directly visible, such as organs. The conventional methods, such as radiography, echography, and so on, allow to obtain plane views of organs and a succinct idea of their aspect. More sophisticated techniques allow to reconstitute detailed cross-sectional views of the human body and synthesis images of organs from a plurality of cross-sectional views.

FIGS. 1 and 2 schematically illustrate two steps of an exemplary conventional technique for obtaining synthesis images of an object. These figures are very schematic and the various elements are shown at arbitrary scales.

FIG. 1 corresponds to a step for obtaining a set of linear radiological density projections of an object in order to obtain a cross-sectional view of the object in a plane The object 10 is examined along axes $A^1$, $A^2$, $A^3$ . . . at various angles, positioned in the desired cross-section plane, and crossing a point 0 of object 10. For each axis, a sensor 12 acquires a profile approximately representing the density projection of object 10 along the considered axis A. Sensor 12 includes elements that are sensitive to excitations specific to the examination technique, for example to X-rays in an X-ray scanner. In the example of an X-ray scanner, a source SX provides an X-ray fan beam to the sensor through object 10, wherein the fan beam is parallel to the cross-section plane. The source SX is placed at a distance from the sensor to obtain substantially parallel rays in the cross-section plane. Each profile acquired along a respective axis A is then stored in a data processing system and corrected to account for the non-parallelism of the beams. Thus, a set of corrected profiles corresponding to radiological density projections of the object are stored in the memory.

FIG. 2 symbolically illustrates how to reconstitute a cross-sectional view of object 10 from density projections. The reconstitution method of FIG. 2 is a mathematical reconstitution usually referred to as a "filtered back projection".

Each projection is first processed by a deconvolution filter, for example a so-called "Shep and Logan" filter, for attenuating the edge effects or the distortions generated by the reconstitution method of the cross-sectional view. With each processed projection is associated a family of co-planar parallel lines. Each line of the family crosses a point of the processed projection and is assigned a coefficient representing the density of the point.

Each family is then directed to a point Oi along an axis corresponding to the respective examination axis A. Each point within the intersection surface of the families is assigned the sum of the density coefficients of the lines that cross this point. Within this surface, a cloud of points corresponding to a cross-sectional view of the examined object 10 is obtained. The density calculated for each point of this cloud substantially represents the density of the point corresponding to the object. The object definition provided by this cloud is all the best as the number of distinct axes A of examination is large.

By suitably processing this cloud of points, it is possible to display the cross-sectional view of the object and to bring out various areas by colors or different shades of gray. The areas that it is desired to bring out correspond, for example, to organs. An organ can be localized in the cross-sectional view with the various characteristics of the points corresponding to the organ, such as a dissimilar density, a dissimilar texture, and so on.

To realize a synthesis image of a full object, or of a part of an object, several consecutive cross-sectional views of the object are realized as explained above. The cross-sectional views are then superposed, and the missing points are interpoled to constitute the external surface of the desired portion. Then, an illumination of this external surface can be simulated to obtain a realistic rendering of its shape.

SUMMARY OF INVENTION

An object of the present invention is to spacially distribute three-dimensional energy corresponding to an image that only existed up to now in calculated form.

This object is achieved with a three-dimensional energy distribution device including a volume reacting to the energy of a predetermined radiation; a plurality of sources of the radiation illuminating the volume according to respective angles; and, placed between each source and the volume, a support that is transparent to the radiation and that includes an image corresponding to a density projection of a real or virtual object that is examined at the angle the respective source illuminates the volume, the projection having been subjected to an image correction process.

According to an embodiment of the invention, the image correction process is intended to correct distortions due to illumination conditions of the volume and/or to examination conditions of the object.

According to an embodiment of the invention, means are provided to render the rays of each source parallel to each other when they penetrate into the volume. The correction process is a Shep and Logan filtering.

According to an embodiment of the invention, the volume is included within a sphere that is transparent to the radiation and whose diameter is selected so that the rays become parallel to each other when they penetrate into the sphere.

According to an embodiment of the invention, the volume is transparent and includes a product that is fluorescent to the radiation.

According to an embodiment of the invention, the volume is a resin that locally polymerizes as a function of the radiation energy.

According to an embodiment of the invention, the support is a slide.

According to an embodiment of the invention, the support is a liquid crystal screen.

According to an embodiment of the invention, the sources are optical fibers connected to a single source.

According to an embodiment of the invention, the sources are realized from a conical laser beam illuminating mirrors that reflect a portion of the conical beam to the supports.

BRIEF DESCRIPTION OF DRAWINGS

The foregoing and other objects, features and advantages of the invention will be apparent from the following detailed description of specific embodiments as illustrated in the accompanying drawings wherein.

The figures are schematic and the elements represented therein are drawn at arbitrary scales.

DETAILED DESCRIPTION OF PREFERRED EMBODIMENTS

The present invention is described hereinafter using an exemplary embodiment for forming a 3-D image.

Figure 1:
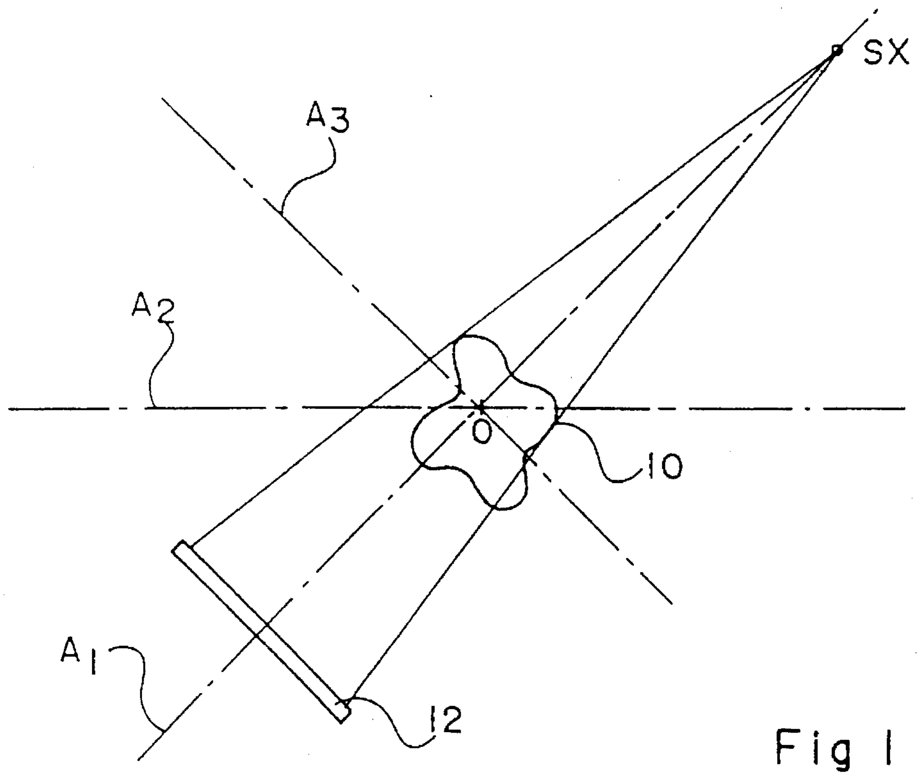
Fig 1 PRIOR ART
FIGS. 1 and 2, above described, illustrate a conventional method for obtaining an image of an object by calculations.

Initially, a virtual object is generated in the memory of a data processing system. The object may be entirely calculated or obtained by initially examining a real object, as in FIG. 1, along various axes A. By mathematically examining this virtual object along various axes A, a surface density projection for each axis is deduced. If the virtual object corresponds to a real object, each surface projection corresponds to the combination of linear projections that were previously obtained conventionally by examining the object according to an associated axis A.

The virtual object can be processed, before mathematical examination, in various ways depending on the image it is desired to constitute therefrom. For example, to simulate an illumination of the object according to a predetermined angle, only the external surface of the object is considered. Each point of this surface is assigned a density that is proportional to the light intensity of this point; the points that do not belong to the external surface are assigned a zero density.

Each surface projection is then processed by a suitable deconvolution (Shep and Logan) filter. A slide is conventionally made from each surface projection, for example by means of a duplicating device. Thus, a set of slides D1, D2, D3 . . . is obtained, each of which represents by different shades of gray a processed surface density projection.

Figure 3:
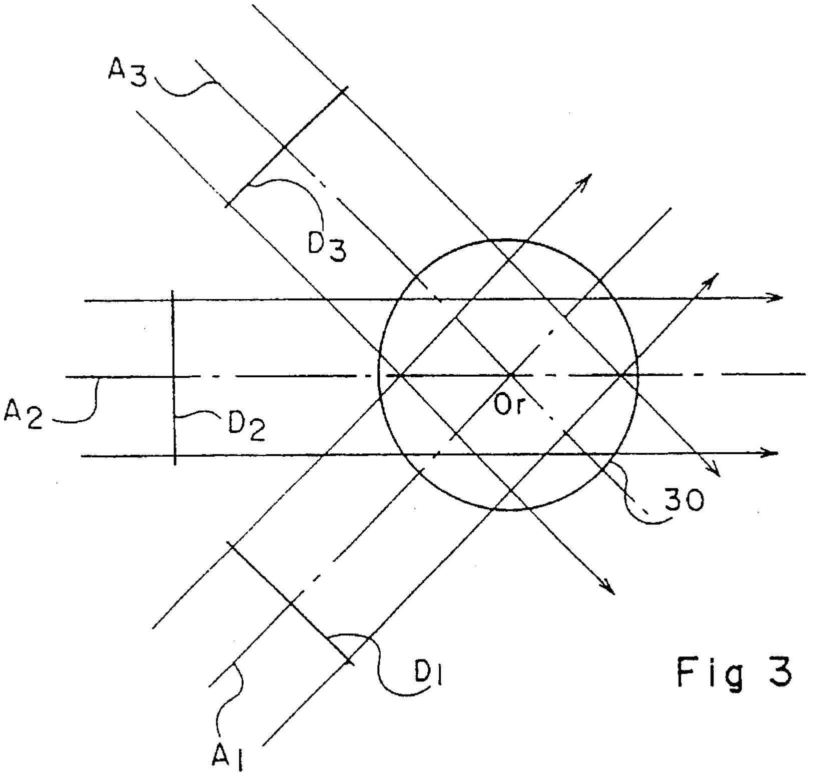
FIG. 3 schematically represents a device according to the invention for distributing three-dimensional energy in space.

FIG. 3 schematically represents how to use slides D to constitute a 3-D image. Beams of parallel rays illuminate a volume 30 according to the examination axes $A_1$, $A_2$, $A_3$ . . . of the virtual object whose image is to be constituted. Each slide D is placed in a beam of the corresponding axis A and is positioned within a plane perpendicular to its axis A to correspond to the conditions of examination of the object.

Volume 30 is of a material transparent to the radiation of the beams and sensitive to the radiation energy. For the constitution of an image in volume 30, this volume contains a fluorescent product, such as rhodamine 6G. The beams are then adapted to emit an adequate wavelength (approximately 540 nm for rhodamine 6G), for example by filtering white light.

Thus, each point of volume 30 reflects a given amount of light as a function of the light energy produced by the rays that intersect this point. A 3-D image, constituted by more or less illuminated areas determined by the shades of gray of slides D, is formed in volume 30.

The definition of the 3-D image is all the best as the number of examination axes, and of the corresponding slides, is large. For a number N of axes, the brightness of approximately $N^2$ distinct points can be individually defined in each plane parallel to the plane of the axes. In practice, 64 axes provide a minimum definition.

To obtain 3-D color images, three sets of slides can be provided, each set of slides being of a different color or illuminated by a light source of different color. Volume 30 then contains three corresponding fluorescent products.

Generally, the diffraction index of volume 30 differs from that of the support where slides D are placed. Accordingly, the rays penetrating into the volume may not remain parallel.

Figure 4:
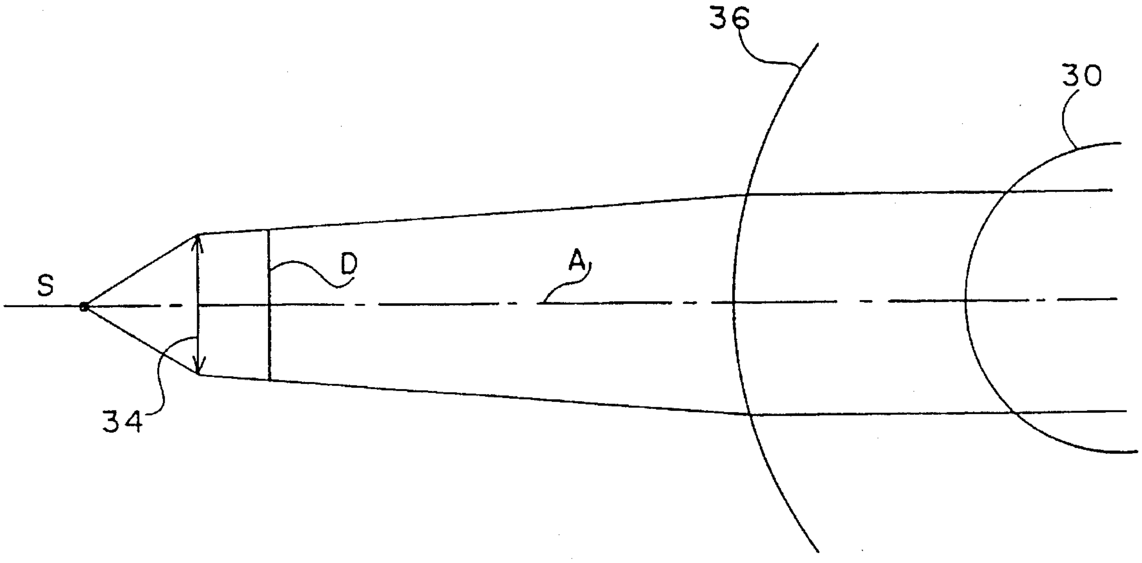
FIG. 4 represents an embodiment of elements of the device of FIG. 3, allowing a practical realization of this device.

FIG. 4 represents a practical embodiment that avoids this drawback. Each slide D is illuminated by a conical beam of predetermined apex. This conical beam is provided, for example, by a convergent lens 34 illuminated by a source S. Volume 30 is placed inside a transparent sphere 36 having the same index as volume 30. The diameter of sphere 36 is selected so that the incoming rays of the conical beam become parallel to each other when penetrating into the sphere. To display the 3-D image in volume 30, this volume is preferably a cylinder having its axis perpendicular to the plane of the slides so that the image can be observed without distortion through the extreme plane surfaces of the cylinder.

In order to suitably position the slides, marks can be printed on them with shades of gray, on an unused area of the slides. Each slide is illuminated when it is positioned, and the marks are made to coincide with a plane target, replacing volume 30, perpendicular to axis A of the slide.

By replacing slides D with liquid crystal displays, on which animated images with determined shades of gray are displayed, 3-D animated images can be displayed in volume 30. It is also possible to realize a flat television screen. For this purpose, volume 30 is realized as a disc, and the slides are replaced with liquid crystal rods disposed in the plane of the disc. The rear surface of disc 30 can be coated with a reflecting layer to improve the quality of the image.

Volume 30 can contain a liquid transparent resin that polymerizes more or less rapidly as a function of the energy of the beam it receives. Accordingly, the areas that receive the greatest part of energy are preferably polymerized to reconstitute a model of the virtual object. Such a resin is for example a monomer transparent to UV-radiations (acrylate), mixed with a small dose of a stimulating material that absorbs UV-radiations ranging from 350 to 360 nm. In practice, such a resin accumulates the energy that it receives. Therefore, only a single light source can be provided to light volume 30, this volume being periodically rotated by a suitable angle while changing the slide.

For the reconstitution of the model of an object, it is also possible to realize volume 30 in a material whose resistance properties to an etching product change under the effect of radiation energy. The model is then extracted by subjecting the volume to the etching product.

Figure 2:
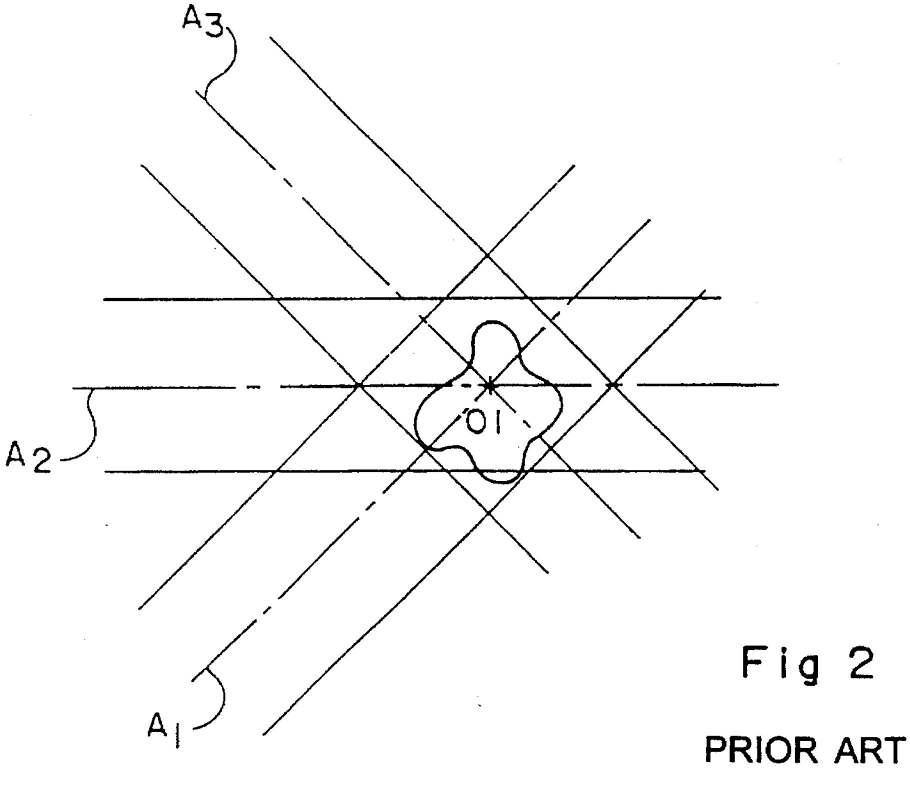
Fig 2 PRIOR ART

Volume 30 can also be realized in a material whose optical properties, for example transparency, durably change under the effect of radiation energy. Thus, a 3-D "photography" of the object can be obtained. By replacing the slides with liquid crystal screens, information can be stored in volume 30 by displaying densities that were previously calculated. The stored information is then as a 3-D "photography" and can be reread by examining volume 30 in the way described in FIGS. 1 and 2 under a suitable radiation. For the storage of binary information, the examination of the volume provides a calculated cloud of points, each point of which is assigned a high density or a low density, depending upon the logic value of a corresponding bit.

Volume 30 can also be realized in a material whose conduction properties change under the influence of radiation energy. Thus, conductive paths can be realized in volume 30 by making suitable slides. The conductive paths will interconnect electronic circuits integrated in volume 30.

The rays that penetrate into volume 30 have been considered as parallel. This allows to obtain images by processing the surface density projections with conventional methods (Shep and Logan filter). However, the rays penetrating into volume 30 can be non-parallel provided that the projections have been previously suitably mathematically processed to correct edge effects or distortions caused by images reconstituted from non-parallel rays.

As is apparent to those skilled in the art, various modifications can be made to the above disclosed preferred embodiments, more particularly in realizing the sources that illuminate each slide. For example, the light can be applied to lens 34 through optical fibers that are connected to a same source. The plane of the slides can be illuminated by a conical laser beam issued by an objective and portions of the conical beam can be reflected to lens 34 through mirrors. More simply, a filtered light source, independent for each slide, can be provided.

We claim:

1. A three-dimensional energy distribution device including:

a volume (30) reacting to the energy of a predetermined radiation;

a plurality of sources of said radiation illuminating said volume according to respective angles ($A_1, A_2, A_3 \ldots$ ); and, placed between each source and the volume, a support ($D_1, D_2, D_3 \ldots$ ) that is transparent to said radiation and that includes an image corresponding to a density projection of a real or virtual object examined at the angle the respective source illuminates the volume, said projection having been subjected to an image correction process.

2. The three-dimensional energy distribution device of claim 1, wherein said projection having been subjected to said image correction process which corrects distortions due to illumination conditions of the volume (30) and/or to examination conditions of the object.

3. The three-dimensional energy distribution device of claim 1, wherein means are provided to render the rays of each source parallel to each other when they penetrate into said volume (30), and wherein the correction process is a Shep and Logan filtering.

4. The three-dimensional energy distribution device of claim 3, wherein said volume (30) is included within a sphere (36) transparent to said radiation and whose diameter is selected so that said rays become parallel to each other when they penetrate into the sphere.

5. The three-dimensional energy distribution device of claim 1, wherein said volume (30) is transparent and includes a product that is fluorescent to said radiation.

6. The three-dimensional energy distribution device of claim 1, wherein said volume (30) is a resin that locally polymerizes as a function of the radiation energy.

7. The three-dimensional energy distribution device of claim 1, wherein said support is a slide.

8. The three-dimensional energy distribution device of claim 1, wherein said support is a liquid crystal screen.

9. The three-dimensional energy distribution device of claim 1, wherein said sources are optical fibers connected to a single source.

10. The three-dimensional energy distribution device of claim 1, wherein said sources are realized from a conical laser beam illuminating mirrors that reflect a portion of said conical beam to the supports.

11. The three-dimension energy distribution device of claim 1, wherein said plurality of sources includes more than two sources.

* * * * *